(12) United States Patent
Isenhour et al.

(10) Patent No.: US 10,114,174 B2
(45) Date of Patent: Oct. 30, 2018

(54) OPTICAL CONNECTORS AND OPTICAL COUPLING SYSTEMS HAVING A TRANSLATING ELEMENT

(75) Inventors: Micah Colen Isenhour, Lincolnton, NC (US); Dennis Michael Knecht, Hickory, NC (US); James Phillip Luther, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 1569 days.

(21) Appl. No.: 13/485,113

(22) Filed: May 31, 2012

(65) Prior Publication Data

US 2013/0322824 A1   Dec. 5, 2013

(51) Int. Cl.
*G02B 6/38* (2006.01)
*G02B 6/32* (2006.01)

(52) U.S. Cl.
CPC ......... *G02B 6/3821* (2013.01); *G02B 6/3885* (2013.01); *G02B 6/32* (2013.01); *G02B 6/3846* (2013.01); *G02B 6/3853* (2013.01)

(58) Field of Classification Search
CPC .................................................. G02B 6/3853
See application file for complete search history.

(56) References Cited

U.S. PATENT DOCUMENTS

| 4,213,677 | A | 7/1980 | Sugimoto et al. | 350/96.18 |
|---|---|---|---|---|
| 4,268,112 | A | 5/1981 | Peterson | 350/96.18 |
| 4,701,011 | A | 10/1987 | Emkey et al. | 350/96.18 |
| 5,172,271 | A | 12/1992 | Sinclair | 359/652 |
| 5,384,874 | A | 1/1995 | Hirai | 385/34 |
| 5,784,512 | A | 7/1998 | Hensen | 385/61 |
| 5,832,153 | A | 11/1998 | Duck | 385/34 |

(Continued)

FOREIGN PATENT DOCUMENTS

| AU | 199898138 B2 | 8/1999 |
|---|---|---|
| CN | 101299086 | 5/2013 |

(Continued)

OTHER PUBLICATIONS

Patent Cooperation Treaty International Search Report, Application No. PCT/US2013/043041, dated Apr. 8, 2014, 5 pages.

(Continued)

*Primary Examiner* — Chris Chu
(74) *Attorney, Agent, or Firm* — Michael E. Carroll, Jr.

(57) ABSTRACT

Optical connectors, optical coupling systems, and methods of optical coupling are disclosed. In one embodiment, an optical connector includes a plug housing, at least one optical fiber, an internal coupling surface, and a translating element. The translating element has a first coupling surface, a second coupling surface, and at least one optical component within the translating element. The translating element is biased such that when the optical connector is in a disengaged state, the translating element is positioned toward an optical connector opening and the second coupling surface of the translating element is displaced from the internal coupling surface. When the optical connector is in an engaged state, the translating element is positioned such that the second coupling surface of the translating element is positioned at the internal coupling surface and the optical fiber is optically coupled to the optical component.

12 Claims, 9 Drawing Sheets

(56) References Cited

U.S. PATENT DOCUMENTS

| | | | | |
|---|---|---|---|---|
| 5,850,493 | A | 12/1998 | Cheng | 385/34 |
| 5,923,802 | A | 7/1999 | Giebel et al. | 385/76 |
| 6,012,852 | A | 1/2000 | Kadar-Kallen et al. | 385/74 |
| 6,033,125 | A | 3/2000 | Stillie et al. | 385/75 |
| 6,157,485 | A | 12/2000 | Cheng | 359/495 |
| 6,246,026 | B1 | 6/2001 | Vergeest | 219/121.72 |
| 6,542,665 | B2 | 4/2003 | Reed et al. | 385/34 |
| 6,632,025 | B2 | 10/2003 | Ukrainczyk | 385/70 |
| 6,655,850 | B2 | 12/2003 | Mann et al. | 385/74 |
| 6,687,424 | B1 | 2/2004 | Ishikawa | 385/34 |
| 6,736,547 | B2 | 5/2004 | Stevens et al. | 385/61 |
| 6,837,625 | B2 | 1/2005 | Schott et al. | 385/60 |
| 6,899,464 | B2 | 5/2005 | Stevens et al. | 385/53 |
| 6,963,687 | B2 | 11/2005 | Vergeest et al. | 385/123 |
| 7,077,576 | B2 | 7/2006 | Luther et al. | 385/59 |
| 7,104,701 | B1 | 9/2006 | Durrant et al. | 385/74 |
| 7,329,050 | B1 | 2/2008 | Dugan et al. | 385/55 |
| 7,346,236 | B2 | 3/2008 | Asano et al. | 385/34 |
| 7,346,237 | B2 | 3/2008 | Matsumura et al. | 385/34 |
| 7,357,005 | B2 | 4/2008 | Matsumura et al. | 65/387 |
| 7,460,750 | B2 | 12/2008 | Durrant et al. | 385/35 |
| 7,572,071 | B1 | 8/2009 | Wu | 385/94 |
| 7,603,008 | B2 | 10/2009 | Matsumura et al. | 385/35 |
| 7,775,725 | B2 | 8/2010 | Grinderslev | 385/74 |
| 9,304,265 | B2 | 4/2016 | Isenhour et al. | |
| 2002/0146211 | A1 | 10/2002 | Stevens et al. | 385/61 |
| 2003/0012513 | A1 | 1/2003 | Ukrainczyk | 385/61 |
| 2003/0021543 | A1 | 1/2003 | Mann et al. | 385/74 |
| 2004/0009697 | A1 | 1/2004 | Clark et al. | 439/362 |
| 2004/0081405 | A1* | 4/2004 | Stevens et al. | 385/56 |
| 2005/0152651 | A1* | 7/2005 | Kim | G02B 6/3508 385/62 |
| 2006/0222299 | A1 | 10/2006 | Durrant et al. | 385/74 |
| 2008/0050072 | A1 | 2/2008 | Durrant et al. | 385/74 |
| 2008/0279509 | A1 | 11/2008 | Durrant et al. | 385/72 |
| 2009/0041412 | A1 | 2/2009 | Danley et al. | 385/85 |
| 2009/0324175 | A1 | 12/2009 | Everett et al. | 385/72 |
| 2009/0324176 | A1 | 12/2009 | Cheng et al. | 385/73 |
| 2010/0027943 | A1 | 2/2010 | Armani et al. | 385/74 |
| 2010/0104244 | A1 | 4/2010 | Grinderslev | 385/74 |
| 2010/0215325 | A1 | 8/2010 | Tamura et al. | 385/89 |
| 2011/0229083 | A1 | 9/2011 | Dainese Junior et al. | 385/74 |
| 2011/0299816 | A1 | 12/2011 | Yen et al. | 385/89 |
| 2012/0099822 | A1 | 4/2012 | Kuffel et al. | 385/78 |
| 2012/0114287 | A1* | 5/2012 | Lin | G02B 6/3821 385/77 |

FOREIGN PATENT DOCUMENTS

| | | |
|---|---|---|
| JP | 63-293510 | 11/1988 |
| WO | WO01/11409 A2 | 2/2001 |
| WO | WO03/076993 A1 | 9/2003 |

OTHER PUBLICATIONS

W. J. Tomlinson, "Applications of Grin-rod lenses in optical fiber communications systems," Applied Optics, Apr. 1, 1980, vol. 19, No. 7, pp. 1127-1138.

Emkey, et al., "Analysis and Evaluation of Graded-Index Fiber-Lenses," Journal of Lightwave Technology, vol. LT-5, No. 9, Sep. 1987, pp. 1156-1164.

Palais, Joseph C, "Fiber coupling using graded-index rod lenses," Applied Optics, Jun. 15, 1980, vol. 19, No. 12, pp. 2011-2018.

http:\\www.cvimellesgroit.com, "Gradient-Index Lenses".

Chanclou, et al., "Design and demonstration of a multicore single-mode fiber coupled lens device," Optics Communications 233, 2004, pp. 333-339.

Senior, et al., "Misalignment losses at multimode graded-index fiber splices and GRIN rod lens couplers," Applied Optics, Apr. 1, 1985, vol. 24, No. 7, pp. 977-983.

Gilsdorf, et al., "Single-mode fiber coupling efficiency with graded-index rod lenses," Applied Optics, Jun. 1, 1994, vol. 33, No. 16, pp. 3440-3445.

Cusworth, et al., "Angular tilt misalignment loss at a GRIN rod lens coupler," Applied Optics, Jun. 1, 1986, vol. 25, No. 11, pp. 1775-1779.

Patent Cooperation Treaty, International Search Report and Written Opinion, dated May 24, 2011, 8 pgs.

CN201380026483.6 Office Action dated Oct. 20, 2015.

\* cited by examiner

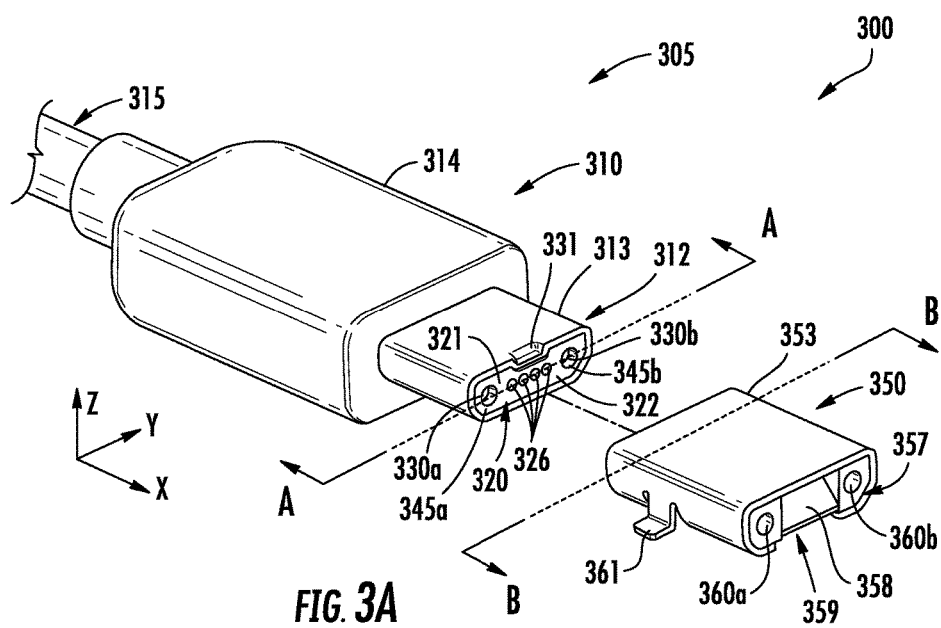
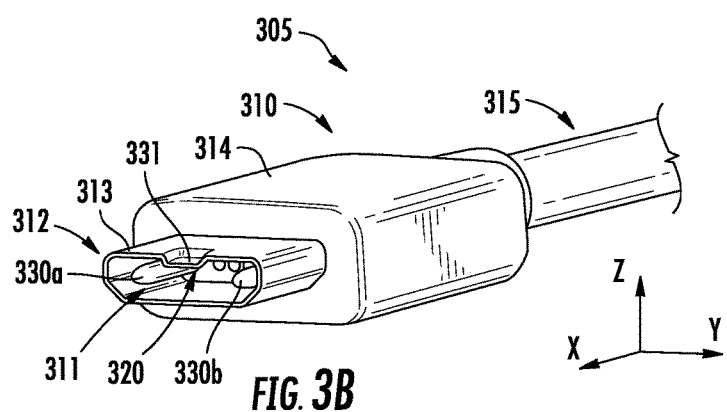

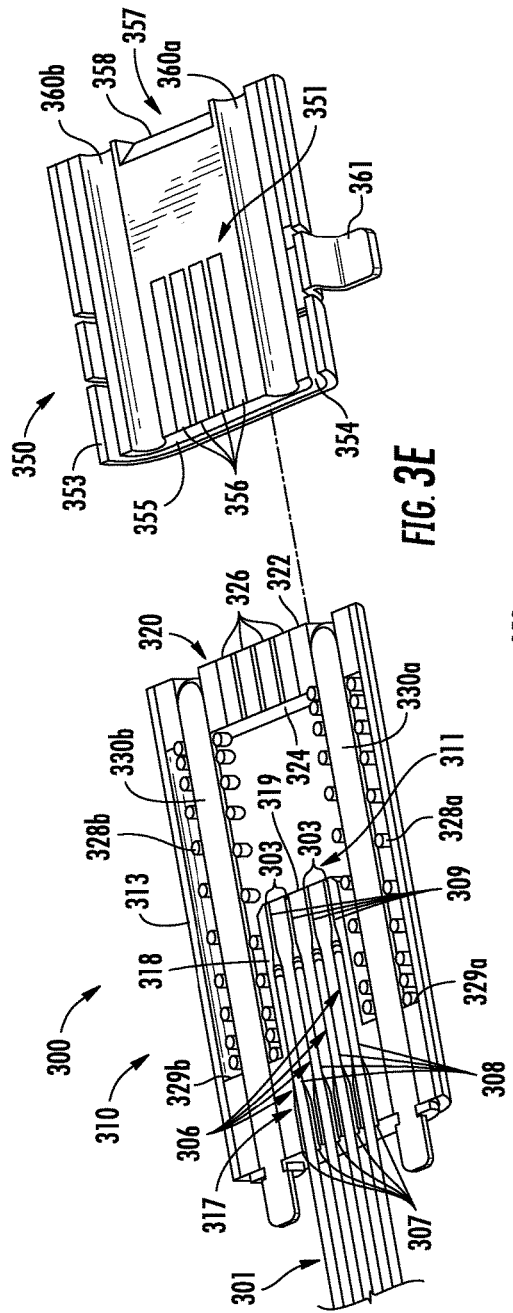
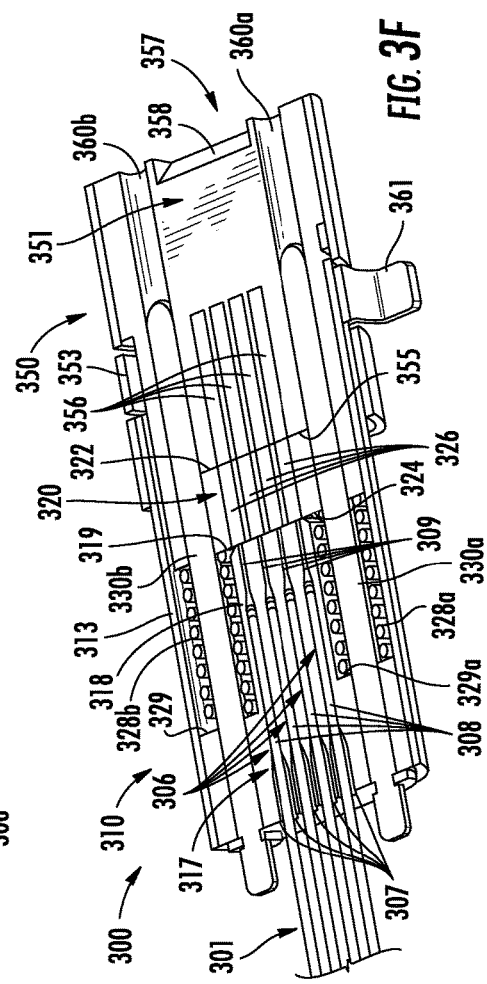
FIG. 3E
FIG. 3F

OPTICAL CONNECTORS AND OPTICAL COUPLING SYSTEMS HAVING A TRANSLATING ELEMENT

BACKGROUND

Field

The present disclosure generally relates to optical couplings and, more particularly, optical coupling systems, optical coupling methods and optical connectors having a translating element that translates within a plug housing without optical fiber movement when coupled to a mated optical coupling.

Technical Background

Fiber optic cables are an attractive alternative to bulky traditional conductor cables (e.g., copper), especially as data rates increase. As the use of fiber optics migrates into numerous consumer electronics applications, such as connecting computer peripherals by the use of fiber optic cable assemblies, there will be a consumer-driven expectation for cables having improved performance such as increased bandwidth, compatibility with future communication protocols, and a broad range of use. Current opto-mechanical interfaces utilized to optically couple an optical cable assembly to active optical components of an electronics device require precise mechanical structures to properly align the optical fibers of the optical cable assembly with the laser(s) and/or photodiode(s) of the electronics device. As such alignments require tight tolerances, the mechanical structures become costly, and may not be rugged enough for consumer electronics applications. Further, the mechanical structures often cause the optical interface of the optical cable assembly and the electronics device to be susceptible to the build-up of foreign substances (e.g., dust, liquid, food particles, etc.) that may interfere with the propagation of optical signals between the optical cable assembly and the electronics device.

To address tight alignment tolerance concerns some optical connector designs have proposed using complex expanded beam lenses having an air gap for collimating the signal and improving coupling. These expanded beam connector designs address the tolerance concerns; however, these designs have many components and may be complex, which increases manufacturing and assembly costs. By way of example, U.S. Pat. No. 6,736,547 discloses a relatively complex connector having many components that uses expanded beam lenses for optically connecting a short piece of fiber in a terminus member of a first connector. Specifically, the short piece of fiber of the '547 patent communicates with a fiber attached to the first connector using an expanded beam arrangement having a first lens separated from a second lens by a substantial air gap. U.S. Pat. No. 6,899,464 is another example of a design that uses expanded beam lenses with a substantial air gap between the lenses. The connector of the '464 patent has microlenses at the end of fibers attached to the connector that transmit optical signals to another set of microlenses attached to fibers in a displaceable block. When the connector of the '464 patent is mated with a complimentary connector, the displacable block has a mated position that provides a substantial air gap between the two arrays of microlenses so collimated light travels within the air gap between lenses. However, this design having the microlenses at the ends of the optical fiber for collimating the signal can be difficult, cumbersome, expensive and time-consuming to precisely manufacture.

Accordingly, there is an unresolved need for alternative optical coupling systems and optical connectors that provide a simple design that allows an optical coupling surface to be user-accessible while also providing alignment of optical components and resistance to external forces when coupled.

SUMMARY

Embodiments of the present disclosure relate to optical connectors, such as optical connectors utilized by optical cable assemblies and electronic devices, for optical communication. As an example, an optical cable assembly may have an optical connector at each end that is configured to mate with corresponding optical connectors of electronic devices so that two (or more) coupled electronics devices may communicate with one another via optical signals over the optical cable assembly.

More specifically, embodiments are directed to optical connectors having a translating element that translates within a plug housing to couple optical fibers of the optical connector to the optical components (e.g., optical fibers, lens components, photodiodes, laser diodes and the like) of a mated optical connector without fiber movement. When in a disengaged state, the translating element is biased forward toward a connector opening such that a coupling surface of the translating element may be cleaned by a user. When the optical connector is coupled to a mated optical connector, the translating element is translated back along an optical axis of the optical connector such that optical components within the translating element optically couple the optical fibers of the optical connector to the optical components of the mated optical connector.

According to one embodiment, an optical connector includes a plug housing that defines an optical connector opening, at least one optical fiber within the plug housing; and a translating element having an optical element and a first coupling surface that is surface accessible at the optical connector opening. The translating element is slidably positioned within the plug housing and is configured to translate within the plug housing to optically couple an end of the at least one optical fiber to an optical interface of a mated optical connector by the optical component.

According to another embodiment, an optical connector includes a plug housing that defines an optical connector opening, at least one optical fiber within the plug housing, an internal coupling surface within the plug housing, and a translating element within the plug housing. An end of the at least one optical fiber is located at the internal coupling surface. The translating element has a first coupling surface and a second coupling surface, and at least one optical component within the translating element that extends from the first coupling surface to the second coupling surface. The translating element is slidably positioned within the plug housing and is biased such that when the optical connector is in a disengaged state, the translating element is positioned toward the optical connector opening such that the second coupling surface of the translating element is displaced from the internal coupling surface. When the optical connector is in an engaged state with a mated optical connector, the translating element is positioned within the plug housing such that the second coupling surface of the translating element is positioned at the internal coupling surface and the at least one optical fiber is optically coupled to the at least one optical component.

According to another embodiment, an optical connector includes an optical connector body, a plug housing extending from the optical connector body that defines an optical connector opening, at least one optical fiber within the plug housing, and an internal coupling surface within the plug housing, wherein an end of the at least one optical fiber is located at the internal coupling surface. The optical connector further includes a first pin and a second pin adjacent to the internal coupling surface and extending toward the optical connector opening, a first bias member positioned about the first pin and a second bias member positioned about the second pin, a translating element, and at least one optical component within the translating element. The translating element includes a first coupling surface, a second coupling surface, a first through-hole and a second through-hole. The at least one optical component extends from the first coupling surface to the second coupling surface. The first pin is positioned within the first through-hole and the second pin is positioned within the second through-hole, and the first and second bias members contact the second coupling surface of the translating element. The translating element is slidably positioned along a single axis within the plug housing such that when the optical connector is in a disengaged state, the translating element is positioned toward the optical connector opening by the first and second bias members such that the second coupling surface of the translating element is displaced from the internal coupling surface. When the optical connector is in an engaged state with a mated optical connector, the first and second bias members are compressed, the translating element is positioned within the plug housing such that the second coupling surface of the translating element is positioned at the internal coupling surface, and the at least one optical fiber is optically coupled to the at least one optical component.

According to yet another embodiment, an optical coupling system includes a first optical connector and a second optical connector. The first optical connector includes a first plug housing that defines an optical connector opening, at least one optical fiber within the plug housing, and an internal coupling surface within the plug housing, wherein an end of the at least one optical fiber is located at the internal coupling surface. The optical connector further includes a first pin and a second pin adjacent to the internal coupling surface and extending toward the optical connector opening, a first bias member positioned about the first pin and a second bias member positioned about the second pin, a translating element, and at least one optical component within the translating element. The translating element has a first coupling surface and a second coupling surface, and at least one optical component that extends from the first coupling surface to the second coupling surface. The translating element is slidably positioned within the first plug housing.

The second optical connector includes a second plug housing, an optical coupling component, and at least one optical element within the optical coupling component. The optical coupling component is positioned within an enclosure defined by the first plug housing such that a gap is between an interior surface of the first plug housing and an exterior surface of the optical coupling component. At least one optical element within the optical coupling component is exposed at the optical coupling surface. When the first optical connector is in a disengaged state, the translating element is positioned toward the optical connector opening such that the second coupling surface of the translating element is displaced from the internal coupling surface. When the first optical connector is in an engaged state with the second optical connector, the first plug housing is positioned within the gap of the second optical connector, the optical coupling component of the second optical connector is positioned within the first plug housing of the first optical connector, the first coupling surface of the translating element is positioned at the optical coupling surface of the optical coupling component, and the second coupling surface of the translating element is positioned at the internal coupling surface and the at least one optical fiber is optically coupled to the at least one optical component.

According to yet another embodiment, a cable assembly includes an optical connector body, an optical cable extending from a rear portion of the optical connector body, a plug housing extending from a front surface of the optical connector body, an internal coupling surface within the plug housing, a translating element having a first coupling surface and a second coupling surface, and at least one optical component within the translating element that extends from the first coupling surface to the second coupling surface. The optical cable includes at least one optical fiber having an end that is located at the internal coupling surface. The plug housing defines an optical connector opening. The translating element is slidably positioned within the plug housing and is biased such that when the optical connector is in a disengaged state, the translating element is positioned toward the optical connector opening such that the second coupling surface of the translating element is displaced from the internal coupling surface. When the optical connector is in an engaged state with a mated optical connector, the translating element is positioned within the plug housing such that the second coupling surface of the translating element is positioned at the internal coupling surface and the at least one optical fiber is optically coupled to the at least one optical component.

According to yet another embodiment, a method of coupling a first optical connector to a second optical connector includes contacting a first coupling surface of a translating element within the first optical connector against a coupling surface of the second optical connector, the translating element comprising at least one optical component, and pushing the first optical connector against the second optical connector such that the translating element translates within the first optical connector until a second coupling surface of the translating element contacts an internal coupling surface of the first coupling surface such that the first optical connector is in an engaged state with respect to the second optical connector and the at least one optical fiber is optically coupled to the at least one optical component.

According to yet another embodiment, a method of coupling a first optical connector to a second optical connector includes providing a first optical connector including a plug housing that defines an optical connector opening, at least one optical fiber within the plug housing, an internal coupling surface within the plug housing, and translating element having a first coupling surface, a second coupling surface, and at least one optical component within the translating element that extends from the first coupling surface to the second coupling surface. An end of the at least one optical fiber is located at the internal coupling surface, and the translating element is slidably positioned within the plug housing.

The method further includes providing a second optical connector including an optical coupling component having an optical coupling surface, wherein when the first optical connector is in a disengaged state with respect to the second optical connector, the translating element of the first optical connector is biased toward the optical connector opening such that the second coupling surface of the translating element is displaced from the internal coupling surface. The method further includes contacting the first coupling surface of the translating element of the first optical connector with the optical coupling surface of the optical coupling component of the second optical connector, and pushing the first optical connector against the second optical connector such that the translating element translates within the plug housing and the second coupling surface of the translating element is located at the internal coupling surface, thereby positioning the first optical connector in an engaged state with respect to the second optical connector wherein the at least one optical fiber is optically coupled to the at least one optical component of the translating element.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

The components of the following figures are illustrated to emphasize the general principles of the present disclosure and are not necessarily drawn to scale. The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3A depicts a perspective view of an optical coupling system comprising a first optical connector and a second optical connector in a disengaged state according to one or more embodiments shown and described herein;

FIG. 3B depicts a perspective view of the first optical connector depicted in FIG. 3A wherein the translating element is translated back into the plug portion;

FIG. 3E depicts a cutaway view of the first and second optical connectors depicted in FIG. 3A in a disengaged state; and FIG. 3F depicts a cutaway view of the first and second optical connectors depicted in FIG. 3A wherein the first and second optical connectors are in an engaged state;

DETAILED DESCRIPTION

Embodiments are directed to optical coupling systems and optical connectors, such as optical connectors utilized by optical cable assemblies and electronic devices, wherein electrical signals generated by a host or client electronics device are converted to optical signals by a transceiver circuit and transmitted over one or more optical fibers. Embodiments of the optical connectors described herein comprise a translating element that translates within a plug portion and optically couples optical fibers of the optical connector to optical components of a coupled device (e.g., optical fibers of a second optical connector, lens components of an electronic device, photodiodes of an electronic device, laser diodes of an electronic device, and the like) without significant movement of the optical fibers as the translating element is translated. The translating element may be biased such that an outward-facing, first optical coupling surface is accessible to a user for cleaning. The translating element may be translated back toward an internal coupling surface against an optical coupling surface of a mated optical connector as a first optical connector is mated to a mated optical connector. Optical connectors, as well as optical coupling systems comprising optical connector assemblies, will be described in further detail herein with specific reference to the appended figures.

Figure 1A:
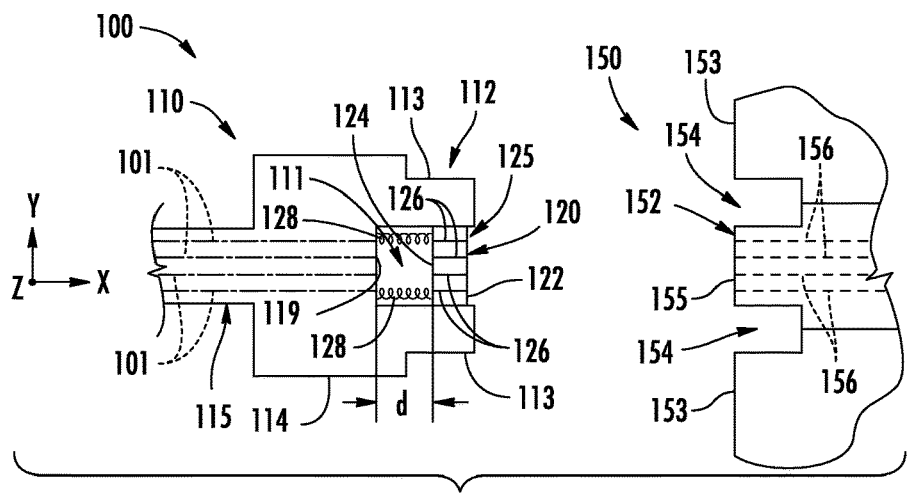
FIG. 1A schematically depicts an optical coupling system comprising a first optical connector and a second optical connector in a disengaged state according to one or more embodiments shown and described herein.
Figure 1B:
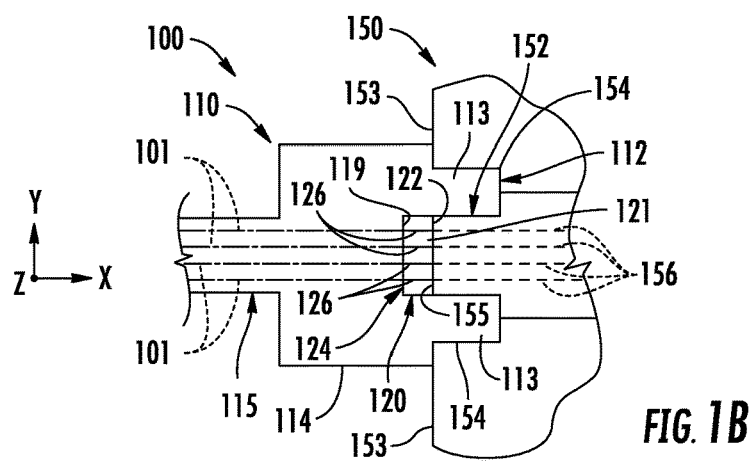
FIG. 1B schematically depicts the optical coupling system depicted in FIG. 1A wherein the first optical connector and the second optical connector are in an engaged state according to one or more embodiments shown and described herein.
Figure 1C:
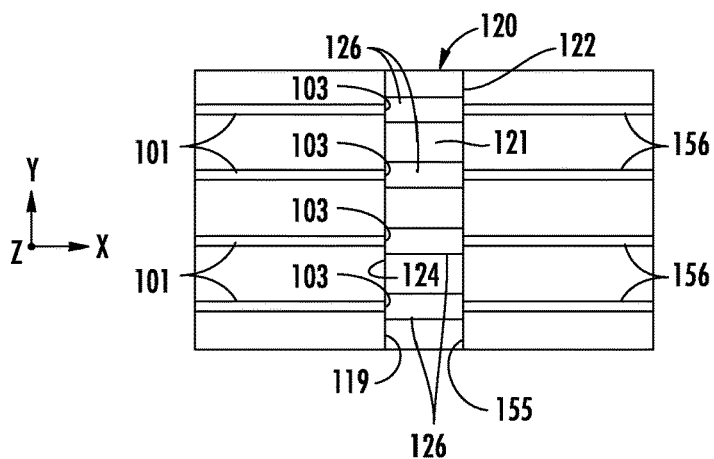
FIG. 1C schematically depicts the interfaces between a translating element, an internal coupling surface, and an optical coupling surface of the optical coupling system depicted in FIG. 1A according to one or more embodiments shown and described herein.

Referring initially to FIGS. 1A and 1B, an optical coupling system 100 comprising a first optical connector 110 of an optical cable assembly and a second optical connector 150 of a second optical cable assembly or a receptacle of an electronic device is schematically illustrated. The first optical connector 110 generally comprises a plug portion 112 defined by a first plug housing 113, an optical connector body 114, and an optical cable 115 containing one or more optical fibers 101.

The first plug housing 113 defines a plug enclosure 111 in which a translating element 120 is positioned. The translating element 120 may maintain one or more optical components 126 configured to permit optical signals to propagate through the translating element 120. Any number of optical components 126 may be provided, depending on the particular application. In one embodiment, the optical components 126 are configured as non-collimating lenses, such as gradient-index lenses. Other lenses or optical components may be utilized. For example, in an alternative embodiment, the optical components 126 may be configured as waveguides or optical fiber stubs though which the optical signals propagate.

The translating element 120 has a first coupling surface 122 which is configured to interface with a coupling surface of a mated optical connector (e.g., the optical coupling surface 155 of the second optical connector 150), and a second coupling surface 124 which is configured to interface with an internal coupling surface 119 within the plug portion 112 or the optical connector body 114. The optical fibers 101 are exposed to the internal coupling surface 119 either directly (e.g., the ends 103 of the optical fibers 101 terminate at the internal coupling surface 119) or indirectly via additional optical components. The optical components 126 may extend from the first coupling surface 122 to the second coupling surface 124. As described in more detail below, the translating element 120 optically couples the internal coupling surface 119 to an optical coupling surface 155 of the second optical connector 150. As used herein, the phrase "optically couple" or "optically coupled" means optical coupling by the contact or near contact of optical components (within about 5 μm) without the use of collimating optical components, such as collimating lenses formed on the ends of optical fibers. For example, ends 103 of optical fibers 101 are optically coupled to optical components 126 such as non-collimating gradient-index lenses within the translating element 120 at a second coupling surface 124 by contacting (or nearly contacting within about 5 μm) ends 103 of the optical fibers 101 with ends of the optical components 126 within the translating element 120. Simply stated, the optical fibers do not require collimating lenses formed on the ends like the conventional connectors.

As shown in FIG. 1A, the translating element 120 may be biased toward an optical connector opening 125 by one or more bias members 128 when the first optical connector 110 is in a disengaged state such that the first coupling surface 122 is located proximate the optical connector opening 125 defined by the first plug housing 113. The first coupling surface 122 of the translating element is surface accessible such that it may be easily wiped clean by a user (i.e., the first coupling surface 122 has minimal features that may inhibit the ability to clean the first coupling surface 122 of debris). The one or more bias members 128 may be any component capable of providing a force on the translating element 120 such that the translating element 120 is biased toward the optical connector opening 125 so that the first coupling surface 122 is accessible to a user for cleaning when the first optical connector 110 is in a disengaged state.

It is noted that when the first optical connector 110 is in a disengaged state, the second coupling surface 124 of the translating element 120 is displaced from the internal coupling surface 119 by a distance d such that any non-collimated optical signals propagating out of the optical fibers 101 (or optical components) positioned behind the internal coupling surface 119 are not emitted from the first coupling surface 122 of the translating element 120 because the translating element 120 is not optically coupled to the internal coupling surface 119 when the first optical connector 110 is in a disengaged state. The displaced translating element 120 may prevent optical signals from reaching the eyes of a user when the first optical connector 110 is in a disengaged state. The translating element 120 may be displaced from the internal coupling surface 119 by a distance d such that the non-collimated optical signals do not enter and propagate within the optical components 126 of the translating element 120. In one embodiment, the second coupling surface 124 of the translating element 120 is displaced from the internal coupling surface 119 by a distance d that is greater than two millimeters when the optical connector is in a disengaged state. It is noted that collimating optical components should not be utilized at the internal coupling surface 119 because collimating optical components, such as collimating lenses, may cause optical signals emitted from the optical fibers 101 at the internal coupling surface 119 to enter the optical components 126 of the translating element even when the first optical connector 110 is in a disengaged state.

The second optical connector 150 comprises a second plug housing 153 and an optical coupling component 152 that is maintained within the second plug housing 153 such that a gap 154 exists between the optical coupling component 152 and the second plug housing 153. The second optical connector 150 may be a component of an optical cable assembly or a component of an electronic device (e.g., a communications port of a computing device).

The optical coupling component 152 may protrude from a rear portion of the second plug housing 153 such that an optical coupling surface 155 of the optical coupling component 152 is positioned near an opening of the second plug housing 153. One or more optical components 156 for optical coupling with the translating element 120 of the first optical connector are positioned within the optical coupling component 152. As described in more detail below, the optical components 156 may include, but are not limited to, optical fibers, lens components (e.g., gradient-index lenses, waveguides), laser diodes, and photodiodes. The optical components 156 are exposed to the optical coupling surface 155 of the optical coupling component 152 such that optical signals may pass between the translating element 120 of the first optical connector 110 and the optical coupling surface 155 of the second optical connector 150 when the first and second optical connectors 110, 150 are in an engaged state.

The gap 154 between the second plug housing 153 and the optical coupling component 152 may be configured to accept the first plug housing 113 of the first optical connector 110 upon insertion of the first optical connector 110 into the second optical connector 150. FIG. 1B depicts the first optical connector 110 engaged with the second optical connector 150. A user inserts the first optical connector 110 into the second optical connector 150 such that the first plug housing 113 is positioned within the gap 154 of the second optical connector 150. As the first optical connector 110 is inserted into the second optical connector 150, the first coupling surface 122 of the translating element 120 contacts the optical coupling surface 155 of the optical coupling component 152, and the force exerted upon the first optical connector 110 causes the optical coupling component 152 to translate the translating element 120 in a negative direction along the x-axis with respect to the optical connector opening 125.

When the first optical connector 110 is fully inserted into the second optical connector 150, the second coupling surface 124 of the translating element 120 is positioned at the internal coupling surface 119 such that optical signals may pass therebetween, and the first coupling surface 122 of the translating element 120 contacts the optical coupling surface 155 of the optical coupling component such that optical signals may pass therebetween. As depicted in FIG.

1C, the optical components 126 of the translating element 120 contact (or nearly contact) the ends of the optical fibers 101 within the optical connector body 114 (or intervening optical components, if present in the optical connector body 114) and the optical components 156 of the optical coupling component 152. In this manner, the first optical connector 110 may be optically coupled to the second optical connector 150 using a translating element 120 without the movement of optical fibers 101 within either the first optical connector 110 or the second optical connector 150. The phrase "without movement of optical fibers," as used herein, means that the optical fibers 101 within the first optical connector 110 remain substantially stationary when the first optical connector 110 is transitioned between engaged and disengaged states. More particularly, the ends of the optical fibers 101 remain substantially stationary when the first optical connector 110 is transitioned between engaged and disengaged states. The translating element 120 yields a more reliable optical connector because the optical fibers do not move within the housing of the optical connector.

Figure 2A:
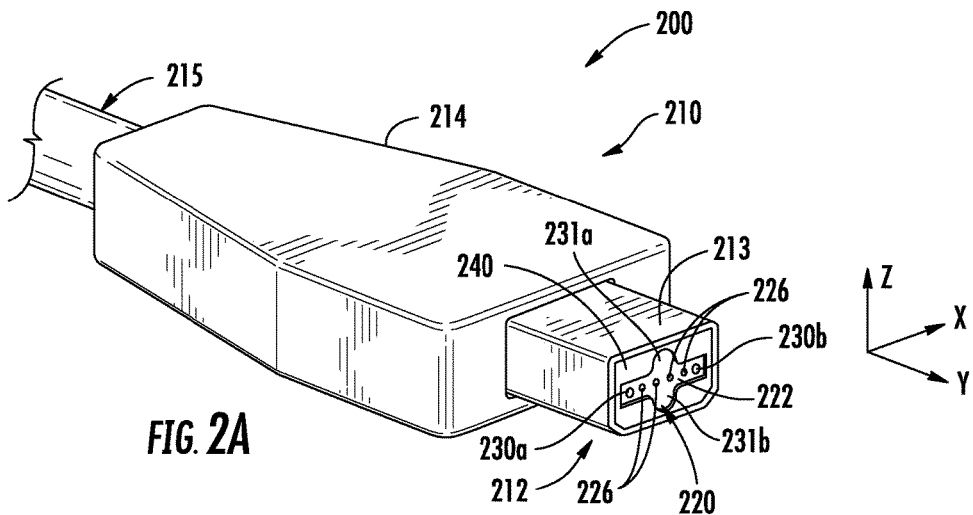
FIG. 2A depicts a perspective view of an exemplary optical connector according to one or more embodiments shown and described herein.
Figure 2B:
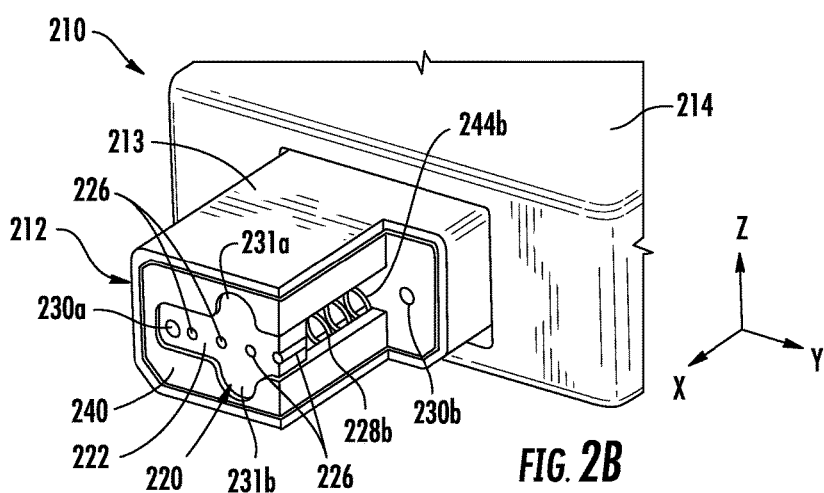
FIG. 2B depicts a partial cutaway view of a plug portion of the optical connector depicted in FIG. 2A.
Figure 2C:
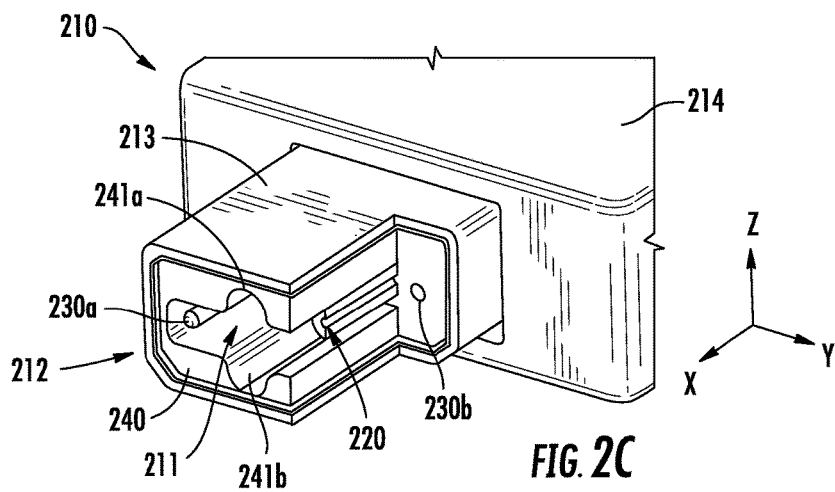
FIG. 2C depicts the partial cutaway view of the plug portion of FIG. 2B wherein the translating element is translated back into the plug portion.

Referring now to FIGS. 2A-2F, an exemplary optical connector 210 of an exemplary cable assembly according to one embodiment is illustrated in a disengaged state. The optical connector 210 may be connected to a mated optical connector of an electronic device, for example. Referring initially to FIG. 2A, the exemplary optical connector 210 generally comprises an optical connector body 214, an optical cable 215 extending from a rear portion of the optical connector body 214, and a plug portion 212 extending from a front surface of the optical connector body 214. The optical cable 215 may comprise optical fibers that are positioned within the optical connector body 214, as described above. The plug portion 212 comprises a plug housing 213, a plug body 240, a translating element 220, and first and second pins 230a, 230b upon which the translating element 220 translates within an enclosure 211 defined by the plug housing 213 and the plug body 240.

The plug body 240 is enclosed by the plug housing 213. In one embodiment, the plug body 240 is a separate component that is positioned within the enclosure 211 defined by the plug housing 213. In another component, the features of the plug body 240 are provided by the plug housing 213 itself such that the plug body and the plug housing are a single component. The plug body 240 (or the plug housing 213) may comprise first and second engagement grooves 241a, 241b that extend along an optical axis of the optical connector correspond to a profile of the translating element 220.

FIGS. 2B-2E are partial cutaway views of the plug portion 212 of the optical connector 210 depicted in FIG. 2A. The illustrated translating element 220 includes one or more optical components 226 (e.g., gradient-index lenses) that extend from the first coupling surface 222 to the second coupling surface 224 within the translating element 220. The optical components 226 may be positioned within bores 227 that extend through the translating element 220 (see FIG. 2F, which is a close-up perspective view of the translating element 220). Ends of the optical components 226 are exposed at the first and second coupling surfaces 222, 224. Although the translating element 220 is depicted as a single component, embodiments are not limited thereto. As an example and not a limitation, the translating element 220 may include an upper component and a lower component that are coupled together by any appropriate adhesive (e.g., see FIGS. 3H-3J).

Figure 2D:
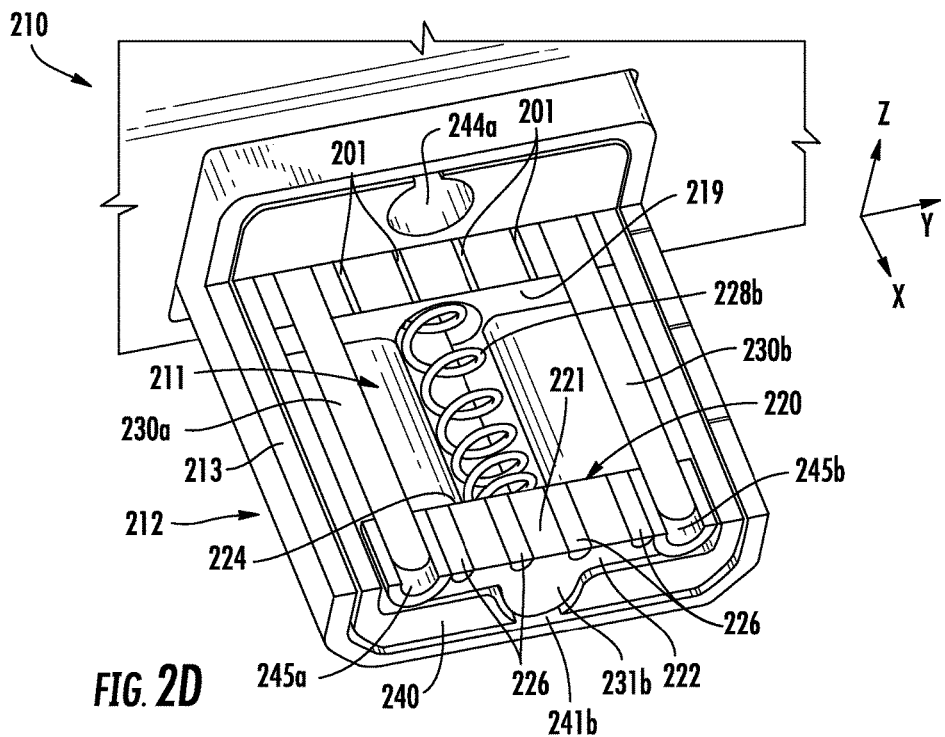
FIG. 2D depicts another partial cutaway view of a plug portion of the optical connector depicted in FIG. 2A.

In the illustrated embodiment, the translating element 220 comprises first and second through-holes 245a, 245b through which the first and second pins 230a, 230b are positioned, respectively (FIG. 2D). The first and second pins 230a, 230b may extend from the internal coupling surface 219 such that they are orthogonal with respect to the opening of the plug portion 212. The first and second pins 230a, 230b may allow the translating element 220 to translate along the x-axis (i.e., the optical axis). In some embodiments, the first and second pins 230a, 230b may be made of an electrically conductive material to allow for the transmission of electric power over the optical cable assembly associated with the optical connector 210. Ends of the first and second pins 230a, 230b are maintained within the first and second through-holes 245a, 245b, respectively, when the translating element 220 is in a disengaged state such that the first coupling surface 222 is accessible to the user for cleaning purposes (i.e., the first and second pins 230a, 230b do not inhibit the user's ability to wipe the first coupling surface 222 clean of debris).

The exemplary translating element 220 further comprises engagement features 231a, 231b that are positioned in the first and second engagement grooves 241a, 241b to also provide for movement of the translating element 220 along the x-axis, as well as to substantially prevent movement of the translating element along the y-axis for proper optical alignment. The engagement features 231a, 231b of the illustrated embodiment are on an upper and lower surface of the translating element 220, respectively.

The optical connector 210 further comprises a first bias member 228a (not visible in FIGS. 2A-2E) and a second bias member 228b that biases a first coupling surface 222 of the translating element 220 toward an opening of the optical connector 210 such that it is accessible to a user for cleaning purposes. Appropriate sealing members may also be provided to prevent debris build-up within the enclosure 211 of the plug portion 212. Embodiments are not limited to two bias members as illustrated in FIGS. 2A-2E, as more or fewer bias members may be provided. In the illustrated embodiment, the first and second bias members 228a, 228b are partially positioned within first and second bias member recesses 244a, 244b, respectively. The first and second bias member recesses 244a, 244b provide a space for the compressed first and second bias members 228a, 228b when the optical connector 210 is in an engaged state, as described below. The engagement features 231a, 231b also act as bias member engagement features that are coupled to the first and second bias members 228a, 228b to provide a surface of the translating element 220 onto which the first and second bias members 228a, 228b may provide a spring force. In an alternative embodiment, only a single bias member may be positioned in a single bias member recesses, for example.

Figure 2E:
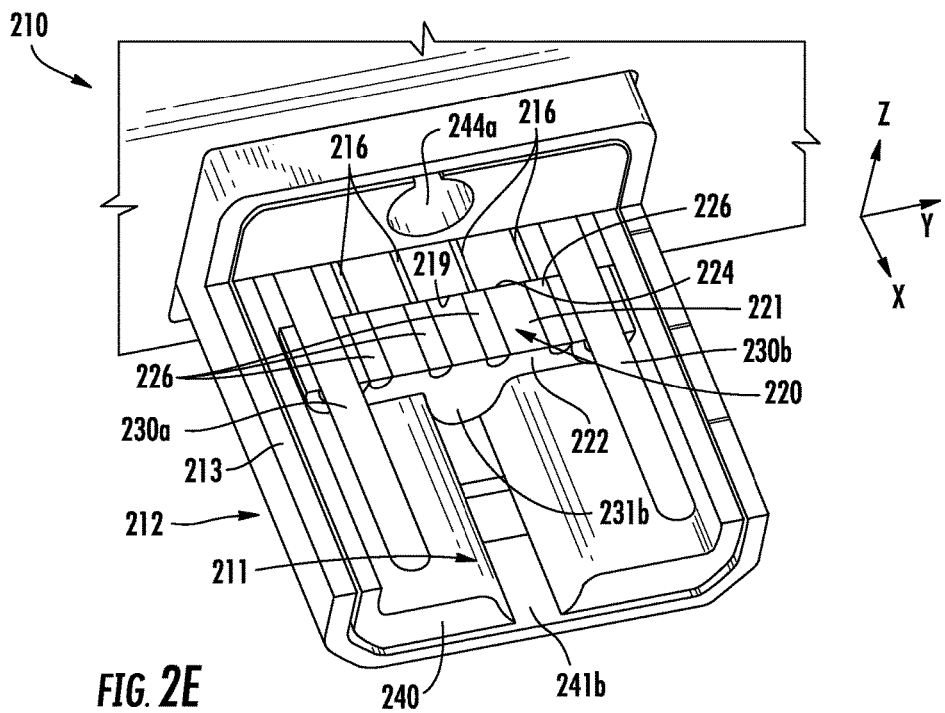
FIG. 2E depicts the partial cutaway view of the plug portion of FIG. 2D wherein the translating element is translated back into the plug portion.
Figure 2F:
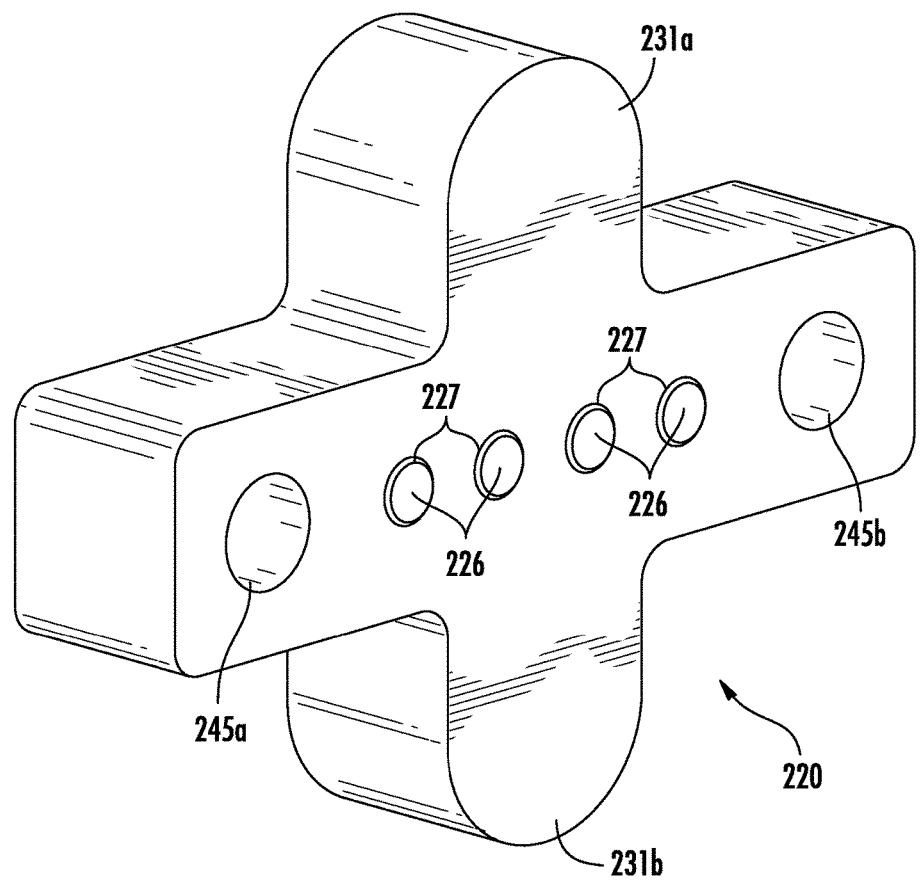
FIG. 2F depicts a perspective view of the translating element according to the optical connector of FIG. 2A.

FIG. 2D is a partial cutaway view of the plug portion 212 in a disengaged state, and FIG. 2E is a partial cutaway view of the plug portion 212 in an engaged state. As shown in FIG. 2D, the first and second bias members 228a, 228b (first bias member 228a is not visible in FIG. 2D) are configured as compression springs that are positioned in first and second engagement grooves 241a, 241b (first engagement groove 241a is not visible in FIG. 2D). The first and second bias members 228a, 228b bias the first coupling surface 222 toward the opening of the plug portion 212 such that the translating element 220 is displaced from the internal coupling surface 219 in the enclosure 211, thereby preventing optical signals from being emitted from the optical connector 210 when in the disengaged state.

As the optical connector 210 is coupled to a mated optical connector (not shown), the translating element 220 is pushed back along the x-axis such that it slides along first and second pins 230a, 230b and first and second engagement grooves 241a, 241b. The compressed first and second bias members 228a, 228b may be maintained within the first and second bias member recesses 244a, 244b positioned behind the internal coupling surface 219 when the optical connector 210 is in an engaged state, allowing the second coupling surface 224 of the translating element 220 to contact the internal coupling surface 219. In this manner, the optical components 226 of the translating element 220 may be optically coupled to the optical fibers 201 at the internal coupling surface 219.

When the optical connector 210 is removed from the mated optical connector, the translating element 220 may be once again biased toward the opening of the plug portion 212.

Figure 3C:
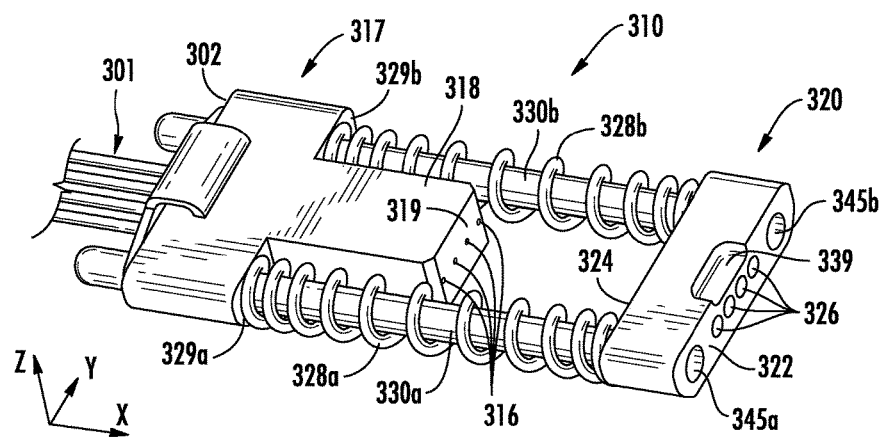
FIG. 3C depicts a perspective view of the first optical connector with the optical connector body and plug housing portions removed.
Figure 3D:
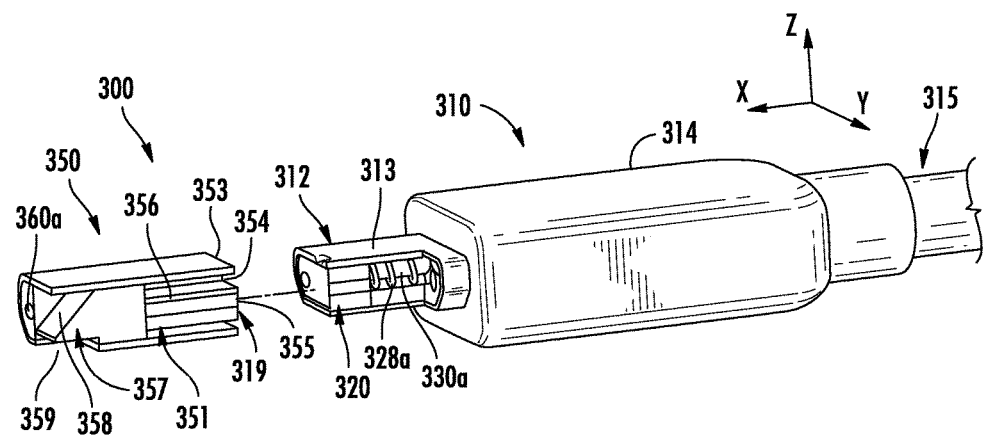
FIG. 3D depicts partial cutaway views of the first and second optical connectors depicted in FIG. 3A.
Figure 3G:
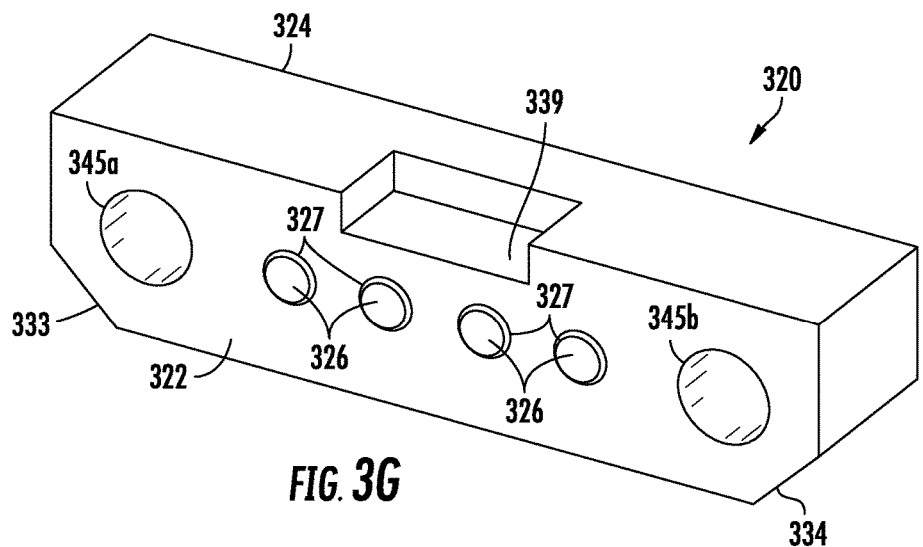
FIG. 3G depicts a perspective view of the translating element according to the optical connector of FIG. 3A.
Figure 3H:
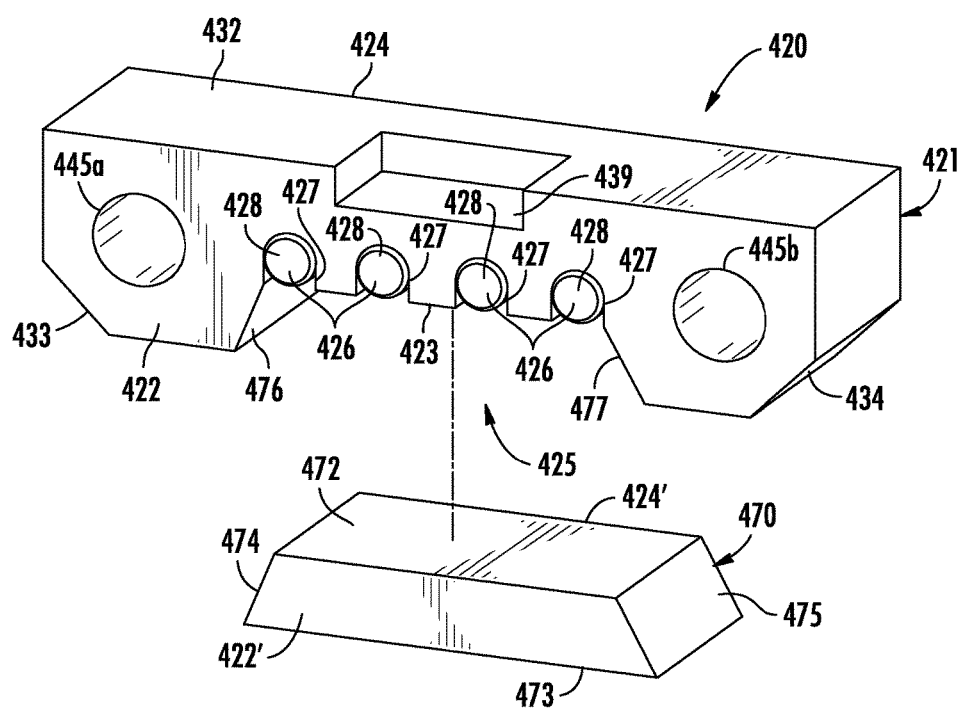
FIG. 3H depicts a partially exploded perspective view of a two-piece translation element according to one or more embodiments shown and described herein.
Figure 3I:
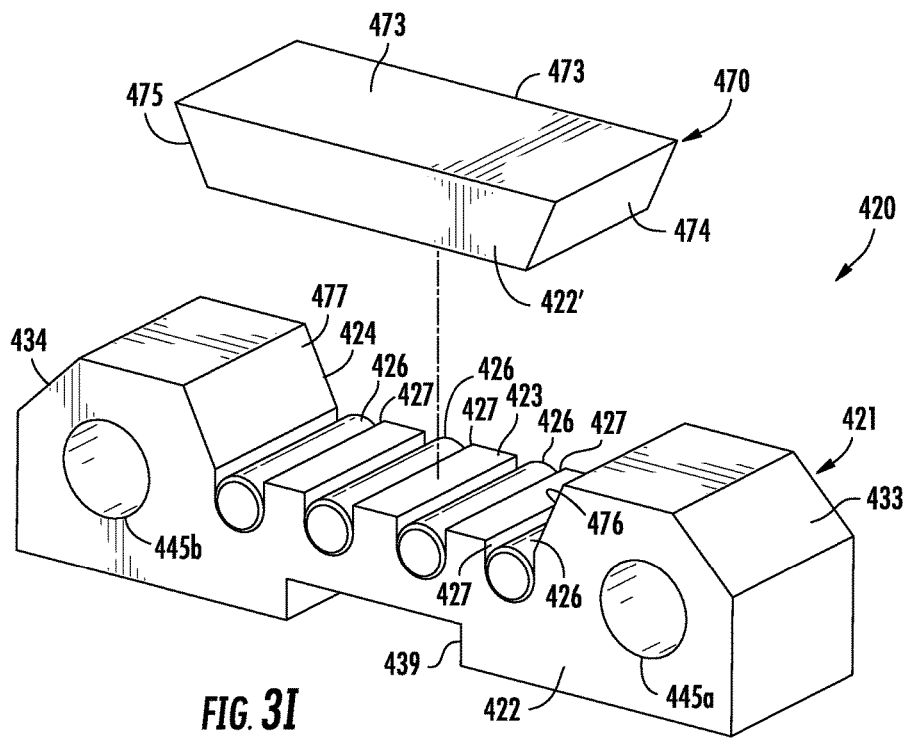
FIG. 3I depicts a bottom perspective view of the two-piece translation element depicted in FIG. 3H.

Referring now to FIGS. 3A-3F, an optical coupling system 300 comprising an exemplary first optical connector 310 of a cable assembly 305 and an exemplary second optical connector 350 according to another embodiment is illustrated. The first optical connector 310 and the second optical connector 350 define an optical coupling system 300. FIG. 3A depicts the first optical connector 310 and the second optical connector 350 in a disengaged state. FIG. 3B depicts the first optical connector 310 with a translating element 320 translated into a first plug portion 312. FIG. 3C depicts internal components of the first optical connector 310. FIG. 3D depicts partial cutaway views of the first optical connector 310 and the second optical connector 350. FIGS. 3E and 3F depict a cross-sectional view of the first optical connector 310 and the second optical connector 350 along lines A-A and B-B, respectively. FIG. 3E depicts the first optical connector 310 and the second optical connector 350 (which is illustrated as a receptacle of an electronic device) in a disengaged state, while FIG. 3F depicts the first optical connector 310 and the second optical connector 350 in an engaged state. FIG. 3G depicts a perspective view of the single-piece translation element. FIGS. 3H and 3I depict an exemplary two-piece translation element 420.

Referring generally to FIGS. 3A-3G, unless specifically indicated otherwise, the exemplary first optical connector 310 generally comprises an optical connector body 314, an optical cable 315 extending from a rear portion of the optical connector body 314, and a first plug portion 312 extending from a front face of the optical connector body 314. The optical cable 315 may comprise optical fibers that extend into the optical connector body 314, as described above.

The first plug portion 312 comprises a first plug housing 313, a translating element 320, and first and second pins 330a, 330b upon which the translating element 320 translates within a plug enclosure 311 (see FIGS. 3B and 3E) defined by the first plug housing 313. The first plug housing 313 may take on a variety of configurations. For example, the first plug housing 313 may be sized and configured according to existing or future connector standards, or may be of a proprietary configuration. In the illustrated embodiment, the first plug housing 313 comprises a first keying feature 331 configured as a notch such that the first optical connector 310 may only mate with the second optical connector 350 in a correct orientation by insertion of the first keying feature 331 into a second keying feature of the second optical connector 350.

As shown in FIG. 3G, the illustrated translating element 320 generally comprises a first coupling surface 322, a second coupling surface 324, and one or more optical components 326 (e.g., GRIN lenses) maintained within bores 327 that extend from the first coupling surface 322 to the second coupling surface 324. Ends of the optical components 326 are exposed at the first and second coupling surfaces 322, 324. The translating element 320 may be shaped such that it may translate within the plug enclosure 311 of the first plug portion 312. The ends of the optical components 326, which may be configured as gradient-index lenses, waveguides, etc., as described above, are exposed at the first and second coupling surface 322, 324. The translating element 320 may also comprise a notch 339 that matches the first keying feature 331 of the first plug housing 313. Further, the translating element 320 may have angled walls 333, 334 that match the geometry of the first plug housing 313.

Referring specifically to FIG. 3C, and generally to FIGS. 3A, 3B, 3D-3G, the first optical connector 310 further comprises an optical fiber coupling component 317 having a protruding portion 318, a first bias member engagement surface 329a, and a second bias member engagement surface 329b. The protruding portion 318 terminates with an internal coupling surface 319 that is closer to the optical coupler opening than the first and second bias member engagement surfaces 329a, 329b along the x-axis (i.e., the optical axis). The optical fibers 301 may enter a rear surface 302 of the optical fiber coupling component 317 and terminate at the internal coupling surface 319 at openings 316 such that the ends of the optical fibers 301 may be optically coupled to the optical components 326 when the first optical connector 310 is coupled to the second optical connector 350. In an alternative embodiment, additional optical components may be located within the optical fiber coupling component 317 between the internal coupling surface 319 and the ends of the optical fibers 301.

Referring briefly to FIG. 3E, the optical fibers 101 may be disposed in bores 306 within the optical fiber coupling component 317. In the embodiment depicted in FIG. 3E, the individual bores 306 comprise a first section 307, a second section 308 and a third section 309. The first section 307 may have a diameter that is larger than an unstripped optical fiber 301 still having an outer jacket for ease of insertion of the optical fiber 301 into the optical fiber coupling component 317 during assembly. The second section 308 may have a reduced diameter from that of the first section 307 that is substantially equal to the diameter of an unstripped portion of the optical fiber 301. Accordingly, the optical fiber 301 may be securely positioned within the second section 308. The third section 309 of the bores 306 may have a diameter that is substantially equal to a fiber core of the optical fiber 301 (i.e., a stripped portion wherein an outer jacket of the optical fiber 301 is stripped away). The ends 303 of the optical fibers 301 may be exposed at the internal coupling surface 319 such that they are planar with respect to the internal coupling surface within 5 μm. It should be understood that other configurations are also possible, such as bores having only one diameter within the optical fiber coupling component 317. The optical fibers 301 may be secured within the bores 306 by a suitable adhesive.

In the illustrated embodiment, a first pin 330a extends from the first bias member engagement surface 329a and a second pin 330b extends from the second bias member engagement surface 329b. In one embodiment, the optical fiber coupling component 317 includes through-holes through which the first and second pins 330a, 330b pass. In another embodiment, the first and second pins 330a, 330b do not pass through the optical fiber coupling component 317, but rather extend directly from the first and second bias member engagement surface 329a, 329b, respectively. The first and second pins 330a, 330b may be electrically conductive to pass electrical power across an optical cable assembly associated with the first optical connector 310.

Referring once again to FIG. 3C, the first pin 330a is positioned through a first bias member 328a and the second pin 330b is positioned through a second bias member 328b. The first and second bias members 328a, 328b are configured as compression springs in the illustrated embodiment. The translating element 320 has a first through-hole 345a and a second through-hole 345b through which the first pin 330a and the second pin 330b are positioned. The first and second bias members 328a, 328b contact the first and second bias member engagement surfaces 329a, 329b, respectively, at a first end, and the second coupling surface of the translating element 320 at a second end. The translating element 320 may translate within the plug enclosure 311 of the first plug housing 313 on the first and second pins 330a, 330b along the x-axis. The translating element 320 is biased toward the connector opening when the first optical connector 310 is in a disengaged state, such that ends of the first and second pins 330a, 330b are within first and second through-holes 345a, 345b, respectively, and the first coupling surface 322 is accessible to the user for cleaning purposes. When the translating element 320 is pushed against the internal coupling surface 319, as depicted in FIG. 3F, the first and second bias members 328a, 328b are fully compressed within a compression region between a plane defined by the internal coupling surface 319 and the first and second bias member engagement surfaces 329a, 329b.

Referring now to FIGS. 3A and 3D, the second optical connector 350 of a cable assembly 305 comprises a second plug housing 353 and an optical coupling component 351 that is maintained within the second plug housing 353 such that a gap 354 exists between the optical coupling component 351 and the second plug housing 153. The second plug housing 353 of the illustrated embodiment is configured to be incorporated into a housing of an electronic device such as, but not limited to, a personal computer, a mobile telephone, a portable computing device, an application-specific computing device, and an electronic storage device. The second plug housing 353 includes mounting tabs 361 that may be used to couple the second optical connector 350 to a surface of the electronic device, such as a printed circuit board, for example.

The optical coupling component 351 comprises an optical coupling surface 355 that is configured to engage with the first coupling surface of the translating element 320. The optical coupling component 351 comprises one or more optical components 356 (e.g., GRIN lenses) that are positioned within the optical coupling component 351 and terminate at the optical coupling surface 355. The optical coupling component 351 further comprises a rear portion 357 having a rear, angled surface 358. The rear portion 357 may be made from a material that is optically transmissive to the wavelength(s) of the optical signals propagating through the one or more optical components 356. The angled surface 358 provides a reflective surface such that optical signals propagating within the rear portion 357 are optically turned by total internal reflection at the angled surface 358. Although not shown in FIGS. 3A-3F, active optical components (e.g., laser diodes, photodiodes, and the like) may be positioned below the angled surface 358 (in recess 359) to transmit and receive optical signals to and from the second optical connector 350.

The optical coupling component 351 further comprises a third through-hole 360a and a fourth through-hole 360b that receive the first pin 330a and the second pin 330b, respectively, of the first optical connector 310 when the two optical connectors are coupled together.

Referring now to FIGS. 3E and 3F, cross-sectional views of the optical coupling system 300 in a disengaged state and an engaged state, respectively, are illustrated. In FIG. 3E, the translating element 320 is biased toward an opening of the first optical connector 310 such that the first coupling surface 322 is accessible to a user for cleaning. When in this position, the translating element 320 is displaced from the internal coupling surface 319 so that optical signals emitted from the internal coupling surface 319 are not emitted from the first optical connector 310.

In FIG. 3F, the first optical connector 310 is mated with the second optical connector 350 such that the first plug housing 313 is positioned within the gap 354 between the second plug housing 353 and the optical coupling component 351, the first and second pins 330a, 330b are positioned in the third and fourth through-holes 360a, 360b of the second optical connector 350, and the translating element 320 is translated in a negative direction along the x-axis such that the second coupling surface 324 contacts the internal coupling surface 319 and the first coupling surface 322 contacts the optical coupling surface 355 of the second connector. In this manner, the optical fibers 301 of the first optical connector 310 are optically coupled to the optical components 356 of the second optical connector 350 via the optical components 326 of the translating element 320.

Figure 3J:
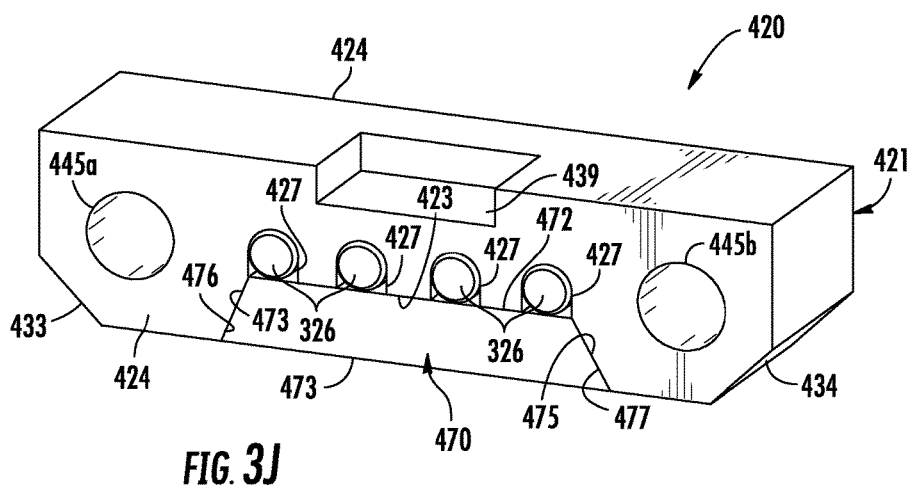
FIG. 3J depicts an assembled perspective view of the two-piece translation element depicted in FIG. 3H.

The translating element may be configured as a single-piece component as depicted in FIGS. 3A-3G, or as a multi-piece component. Referring to FIGS. 3H-3J, an exemplary two-piece translating element 420 is depicted in a partially exploded and assembled view, respectively. The two-piece translating element 420 comprises an upper component 421 and a lower component 470 configured as a cover that fits within an opening 425 defined by the upper component 421. The assembled two-piece translating element 420 has a similar shape and configuration as the single translating element 320 depicted in FIGS. 3A-3G. Similar to the single translating element 320, the two-piece translating element 420 has a first coupling surface 422 that interfaces with a mated optical connector and a second coupling surface 424 that interfaces with an internal coupling surface (e.g., internal coupling surface 319).

The upper component 421 comprises the first and second through-holes 445a, 445b through which the first pin and second pin may be positioned, as described above with reference to FIGS. 3A-3F. The upper component 421 may also have angled walls 433, 434 that match the geometry of the plug housing (e.g., first plug housing 313), and a notch 439 that matches the first keying feature of the plug housing. The upper component 421 further comprises inwardly angled walls 476 and 477 that slope from a bottom surface of the upper component to an inner surface 423. The inwardly angled walls 476, 477 define an opening configured to receive the lower component 470, as described below and illustrated in FIG. 3J.

The inner surface 423 of the upper component 421 comprises one or more grooves 427 that extend from the first coupling surface 422 to the second coupling surface 424 (see FIG. 3I). An optical component 426, such as a GRIN lens, is positioned within each groove 427. The two-piece translating element 420 may enable easier placement of the optical components 426 because of the access to the grooves 427 provided by the opening 425. The grooves 427 may be of any appropriate geometry. In the illustrated embodiment, the grooves 427 have straight walls and a curved floor to accommodate the cylindrical optical components 426, and the inner surface 423 is planer with respect to a top surface of the optical components 426. However, other configurations are also possible, such as V-shaped grooves or rectangular grooves. The optical components 426 may be secured within the grooves 427 by a suitable adhesive, for example.

The lower component 470, which acts as a cover for the optical components 426, has an upper, optical component contacting surface 472, a bottom surface 473, and two angled walls 474, 475 that are configured to interface with inwardly angled walls 476, 477 of the upper component 421, respectively. The lower component also has a first coupling surface 422' and a second coupling surface 424'. The lower component 470 may be positioned within the opening 425 of the upper component 421 after positioning the optical components 426 within the grooves 427 such that the optical component contacting surface 472 contacts the bottom surface 473 of the upper component 420 and the optical components 426, and angled walls 473, 474 of the lower component 470 contact inwardly angled walls 476, 477 of the upper component 421, respectively (FIG. 3J). The lower component 470 may be secured to the upper component 420 by a suitable adhesive.

The first coupling surface 422' of the lower component 470 should be substantially planar with respect to the first coupling surface 422 of the upper component 420 and the end faces 428 of the optical components when the lower component 470 is mated to the upper component 420. In one embodiment, the first coupling surface 422' of the lower component 470, the first coupling surface 422 of the of the upper component 420, and the end faces 428 of the optical components 426 are within 10 μm of each other. Similarly, the second coupling surface 424' of the lower component 470 should be substantially planar with respect to the second coupling surface 424 of the upper component 420 and the end faces (not shown in FIGS. 3H-3J) of the optical components 426 (e.g., within 10 μm of each other).

It should now be understood that embodiments are directed to optical connectors having an internal translating element that may translate within a plug portion without fiber movement. The translating element comprises optical components that may couple the optical fibers within the optical connector to optical components (e.g., optical fibers, lens components, and/or active optical components) of a mated optical connector. Additionally, one or more bias members may bias the translating element toward an opening of the optical connector such that a coupling surface of the translating element may be accessible for cleaning by a user. Embodiments are also directed to a mated optical connector having an optical interface or surface that contacts the coupling surface of the translating element and translates the translating element toward an internal coupling surface associated with the optical fibers of the optical connector.

What is claimed is:

1. An optical connector comprising:
   a plug housing that defines an optical connector opening;
   at least one optical fiber within the plug housing;
   a translating element comprising an optical component and a first coupling surface that is surface accessible at the optical connector opening, wherein the translating element is slidably positioned within the plug housing and is configured to translate within the plug housing to optically couple an end of the at least one optical fiber to an optical interface of a mated optical connector by the optical component; and
   an internal coupling surface within the plug housing, wherein the end of the at least one optical fiber is located at the internal coupling surface; and wherein the translating element further comprises a second coupling surface and at least one non-collimating optical component extending from the first coupling surface to the second coupling surface, wherein the second coupling surface is opposite from the first coupling surface and faces the internal coupling surface of the plug housing.

2. The optical connector of claim 1, wherein the translating element translates within the plug housing without movement of the at least one optical fiber.

3. The optical connector of claim 1, further comprising a spring disposed between the internal coupling surface of the plug housing and a bias engagement surface of the translating element, wherein the translating element is biased by the spring such that:
   when the optical connector is in a disengaged state, the translating element is positioned toward the optical connector opening; and
   when the optical connector is in an engaged state with a mated optical connector, the translating element is positioned within the plug housing proximate to the end of the at least one optical fiber.

4. An optical connector comprising:
   a plug housing that defines an optical connector opening;
   at least one optical fiber within the plug housing;
   an internal coupling surface within the plug housing, wherein an end of the at least one optical fiber is located at the internal coupling surface; and
   a translating element having a first coupling surface and a second coupling surface;
   at least one optical component within the translating element that extends from the first coupling surface to the second coupling surface, wherein the translating element is slidably positioned within the plug housing and is biased such that:
   when the optical connector is in a disengaged state, the translating element is positioned toward the optical connector opening such that the second coupling surface of the translating element is displaced from the internal coupling surface; and
   when the optical connector is in an engaged state with a mated optical connector, the translating element is positioned within the plug housing such that the second coupling surface of the translating element is positioned at the internal coupling surface and the at least one optical fiber is optically coupled to the at least one optical component; and wherein the second coupling surface is opposite from the first coupling surface and faces the internal coupling surface of the plug housing.

5. The optical connector of claim 4, wherein the at least one optical component comprises a waveguide.

6. The optical connector of claim 4, wherein the at least one optical component comprises a gradient-index lens.

7. The optical connector of claim 4, further comprising a bias member within the plug housing disposed between the internal coupling surface and a bias member engaging surface of the translating element that biases the translating element toward the optical connector opening when the optical connector is in the disengaged state.

8. The optical connector of claim 4, further comprising a first pin and a second pin extending from the internal coupling surface, wherein:
   the first pin and the second pin are positioned within the plug housing and extend toward the optical connector opening;

the translating element comprises a first through-hole and a second through-hole;

the first pin is positioned within the first through-hole and the second pin is positioned within the second through-hole; and the translating element translates on the first pin and the second pin within the plug housing along an optical axis of the optical connector.

9. The optical connector of claim 8, further comprising a bias member within the plug housing that biases the translating element toward the optical connector opening when the optical connector is in the disengaged state.

10. The optical connector of claim 4, wherein:

the plug housing comprises an engagement groove that is parallel to an optical axis of the optical connector; and the translating element comprises an engagement feature that is positioned within the engagement groove such that the translating element translates within the plug housing along the optical axis of the optical connector.

11. The optical connector of claim 4, wherein the plug housing defines an enclosure to receive a plug portion of the mated optical connector.

12. The optical connector of claim 4, further comprising an optical connector body and a bias member, wherein:

the plug housing extends from a coupling surface of the optical connector body;

the optical connector body comprises a bias member recess within the internal coupling surface;

the translating element comprises a bias member engagement surface; and the bias member engages the bias member recess and the bias member engagement surface such that the bias member is substantially positioned within the bias member recess when the optical connector is in the engaged state.

* * * * *